(12) United States Patent
Kertesz

(10) Patent No.: US 6,294,234 B1
(45) Date of Patent: Sep. 25, 2001

(54) FLUID CONDUIT FOR FUELS AND FUEL VAPORS

(75) Inventor: Janos Kertesz, Hofheim (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/238,226

(22) Filed: Jan. 27, 1999

(30) Foreign Application Priority Data

Jul. 16, 1998 (DE) ................................................ 198 31 898

(51) Int. Cl.$^7$ .................................................... F16L 11/04
(52) U.S. Cl. .................... 428/34.7; 428/36.4; 428/36.91; 138/137; 138/141; 138/146
(58) Field of Search ................................. 428/36.9, 36.91, 428/34.5, 34.7, 36.4; 138/137, 141, 146

(56) References Cited

U.S. PATENT DOCUMENTS

| | | | |
|---|---|---|---|
| 4,058,165 | 11/1977 | Holden et al. ....................... 166/314 |
| 4,657,083 | 4/1987 | Ringgenberg ....................... 166/374 |
| 5,380,571 | * 1/1995 | Ozawa et al. ....................... 428/36.9 |
| 5,468,530 | * 11/1995 | Gotz et al. ....................... 428/36.4 |
| 5,476,080 | * 12/1995 | Brunnhofer ....................... 138/137 |
| 5,476,120 | 12/1995 | Brunnhofer ....................... 138/137 |
| 5,671,780 | 9/1997 | Kertesz ....................... 138/127 |
| 5,733,619 | * 3/1998 | Patel et al. ....................... 428/36.91 |
| 5,792,532 | * 8/1998 | Pfleger ....................... 428/36.9 |
| 5,910,540 | * 6/1999 | Takahashi ....................... 525/92 B |
| 6,089,278 | * 7/2000 | Nishino et al. ....................... 138/137 |
| 6,090,459 | * 7/2000 | Jadamus et al. ....................... 428/36.4 |

FOREIGN PATENT DOCUMENTS

| | | |
|---|---|---|
| 20 42 073 C3 | 8/1970 | (DE) . |
| 31 21 241 C2 | 5/1981 | (DE) . |
| 42 02 397 C2 | 1/1992 | (DE) . |
| 42 02 399 C1 | 1/1992 | (DE) . |
| 42 14 383 C1 | 4/1992 | (DE) . |
| 42 38 606 C1 | 11/1992 | (DE) . |
| 43 30 855 C1 | 9/1993 | (DE) . |
| 195 04 614 A1 | 2/1995 | (DE) . |
| 0 637 509 A1 | 8/1994 | (EP) . |

* cited by examiner

*Primary Examiner*—Rena L. Dye
(74) *Attorney, Agent, or Firm*—Darby & Darby

(57) ABSTRACT

A fuel or fuel vapor fluid conduit includes a first thermoplastic material including a thermoplastic polyester elastomer. A second thermoplastic material includes a thermoplastic polyester having higher bending and flexibility than the bending and flexibility of the first thermoplastic material. The second material has a lower tensile strength and impact strength than the tensile strength and impact strength of the first material.

13 Claims, 1 Drawing Sheet

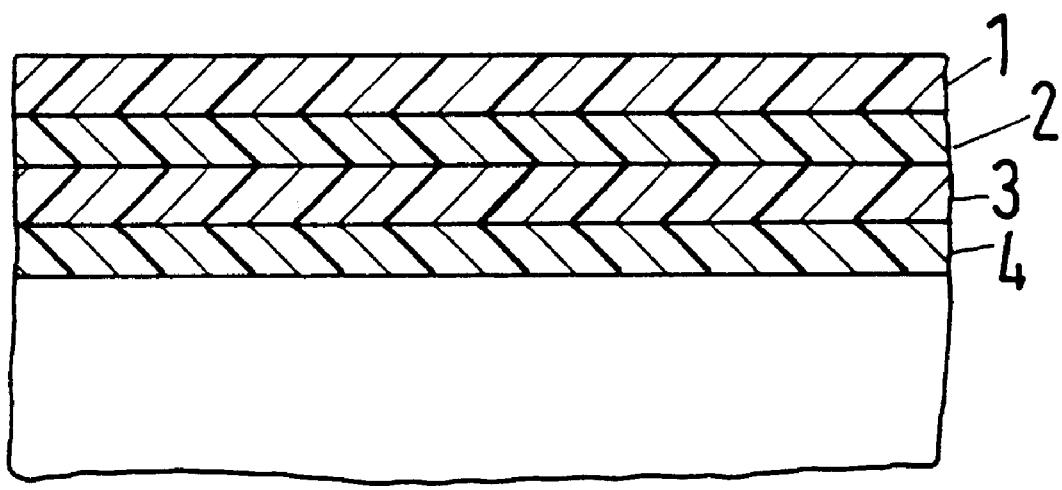

FLUID CONDUIT FOR FUELS AND FUEL VAPORS

BACKGROUND OF THE INVENTION

1. Field of the Invention

The present invention relates to a fluid conduit for fuels and fuel vapors (hereinafter "fuel or fuel vapor fluid conduits"). More specifically, the present invention relates to fuel or fuel vapor fluid conduits that are made of thermoplastic materials.

2. Discussion of the Related Arts

To meet the requirements of fuel or fuel vapor fluid conduits, such as, for example, high diffusion-blocking ability, flexibility, tensile strength and impact strength, conventional fluid conduits have been produced from several layers. Each layer satisfies some of these requirements. But these several layers are not compatible with each other. In other words, the layers (e.g., polyvinylidenefluoride and polyamide) must be joined to each other by bonding. Compatibility or adhesive agents are used to bond these chemically diverse materials to each other. Once the conventional fluid conduit is made, the bonded layers of material, which together form the fluid conduit, can not be used in a recycling process to produce new conduits.

SUMMARY OF THE INVENTION

It is an object of the present invention to provide a fuel or fuel vapor fluid conduit that is made from a reusable material and satisfies the requirements of these types of fluid conduits.

This and other objects are achieved, in accordance with a currently preferred exemplary embodiment of the present invention, by a fluid conduit that is made from a first thermoplastic material including a thermoplastic polyester elastomer and a second thermoplastic material including a thermoplastic polyester having a higher bending strength and flexibility and a lower tensile strength and impact strength than the first material.

The first and second thermoplastic materials, in combination, meet the essential requirements for fuel and fuel vapor conduits, such as, for example, low fuel permeation, high flexibility, tensile strength and impact strength. The fluid conduit made from the first and second thermoplastic materials is preferably hot formed, for example, by extrusion, and the materials are joined in this process by fusion. Moreover, the fluid conduit material can, after being melted down, be reused in a recycling process to produce a new fluid conduit.

The waste materials, such as, for example, clippings that are produced during the manufacturing of the fluid conduit, can also be reused.

The first and second materials can be mixed together. A fluid conduit formed from the mixed materials still meets the essential requirements of fuel or fuel vapor fluid conduits.

The fluid conduit, however, preferably includes a first and a second layer. The first layer preferably contains the first material and the second layer preferably contains the second material. The first material, which withstands the higher mechanical stresses, is preferably placed radially outside of the second material.

There are preferably more than two layers and first and second materials are preferably contained in alternating layers. A fluid conduit constructed in this manner can withstand especially high requirements. The mixture of the two materials can be contained in an additional layer so as to meet even higher requirements, and all layers (i.e., a layer of the first material, a layer of the second material, and a layer of the mixture of the two materials) can be coextruded.

The first material is preferably selected from the group consisting of a block copolymer of hard (crystalline) blocks of polybutyleneterephthalate and soft (amorphous), long-chain blocks of polyetherglycol and a thermoplastic polyester elastomer based on polybutylenenaphthalate. These substances bridge the gap between rubber/elastomer and high performance plastics and combine the characteristic strength and processability of plastics with the flexibility, tensile strength and impact strength of rubber/elastomer.

The second material is preferably selected from the group consisting of polybutyleneterephthalate, polyethyleneterephthalate, polybutylene-naphthalate and polyethylenenaphthalate.

The thickness ratio of the layers are preferably selected so that alone the fluid conduit has a sufficiently high clamping force so as to be securable on a pipe socket against unintended pulling off under certain predetermined rated conditions.

The overall thickness of the second layer(s) is preferably 10 to 70% of the overall wall thickness of the fluid conduit.

One of the layers may have a reinforcement selected from the group consisting of glass fibers, steel fibers, glass balls and minerals, as well as a mixture of at least two of these reinforcement materials. A fluid conduit having such a reinforcement can withstand especially high mechanical loads.

To avoid an electrostatic charge and the associated danger of creating a spark, one of the layers may be electrically conductive or antistatic.

The fluid conduit can be sheathed with a flame protection layer. The flame protection layer is preferably made from a reusable material and is joined, by fusion, with the first and/or second material (e.g., by a thicker thermoplastic polyester elastomer).

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawing, wherein:

The sole drawing FIGURE schematically shows, on an enlarged scale, a cut out of a fluid conduit according to the present invention.

DETAILED DESCRIPTION OF A PREFERRED EMBODIMENT

Referring now to the sole drawing FIGURE, a fluid conduit, comprising of four layers 1, 2, 3 and 4, is illustrated. Layers 2 and 4 are made of a first material having a thermoplastic polyester elastomer. Layers 1 and 3 are made of a second material having a thermoplastic polyester elastomer having a higher bending and flexibility and a lower tensile strength and impact strength than the first material. These materials are joined, by fusion, with the aid of an adhesion agent. Additionally, these materials are reusable.

The first material is preferably a block polymer of hard crystalline polybutyleneterephthalate blocks and soft amorphous, long-chain polyetherglycol blocks. Alternatively, the first material can also be a thermoplastic polyester elastomer based on polybutylenenaphthalate.

The second material is a substance chosen from the group of polybutyleneterephthalates, polyethyleneterephthalates, polybutylenenaphthalates and polyethylenenaphthalates.

Because the first and second materials are compatible with each other, it is possible to hot-form the fluid conduit, for example, by coextrusion. The first and second materials are joined during this process by fusion.

The first and second materials meet, especially when arranged in an alternating arrangement in various layers, all essential requirements for fuel and fuel vapor conduits, such as, for example, low fuel permeation high flexibility, tensile strength and impact strength.

The thickness ratios of layers 1–4 are preferably selected in such a way that the fluid conduit alone develops a sufficiently high clamping force on a pipe socket against unintended pulling off under certain predetermined rated conditions. The overall thickness of the layers 2 and 4 preferably lies within 10 to 70% of the overall wall thickness of the fluid conduit.

In another embodiment of the fluid conduit, only layers 1 and 2, instead of all four layers, may be used. Of course, it is also possible in further embodiments to provide more than four layers.

The sequence of the first and second materials in layers 1–4 can also be selected so that the layers with the uneven numbers 1, 3 contain the second material and the even numbered layers 2, 4 contain the first material. This reversing of the materials in the layers can be done even if there are only two or three layers.

Instead of producing layer 3 from the first material, it can also be made from a mixture of the first and second material. Any other layer can also be made from a mixture of the first and second materials. It is also possible to produce the fluid conduit so that it has only a single layer, which is made from a mixture of the two materials.

In addition, one of layers 1–4 can have a reinforcement embedded therein, the reinforcement being selected from the group consisting of glass fibers, steel fibers, glass balls and minerals, as well as a mixture of at least two of these reinforcement materials. Such a reinforced fluid conduit can withstand relatively high mechanical loads.

In a further alternative embodiment, one of the layers can be electrically conductive or antistatic to avoid the danger of igniting the fuels traversing through the fluid conduit by an electric spark discharge. If the layer is electrically conductive, its ohmic resistance should be less than about $10^3$ ohms. If the layer is antistatic, the ohmic resistance should be within the range of $10^4$ to $10^7$ ohms.

The fluid conduit of any of the embodiments of the present invention can be sheathed with a flame protection layer (not shown) to protect the conduit in case of a fire, which may occur, for example, in the engine compartment of a motor vehicle. The flame protection layer is preferably formed by fusion with the first and/or second material. The flame protection layer is a reusable material, preferably a thermoplastic polyester elastomer.

The fluid conduit may have a smooth exterior surface, but may also have a corrugated or alternating smooth and corrugated exterior surface.

Having described the presently preferred exemplary embodiment of a fuel or fuel vapor fluid conduit in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A fuel or fuel vapor fluid conduit comprising:

a first thermoplastic material including a thermoplastic polyester elastomer;

a second thermoplastic material including a thermoplastic polyester material having higher bending strength and tensile strength than the bending strength and tensile strength of the first thermoplastic material, said second material having a lower extensibility and impact strength than the extensibility and impact strength of said first material; and a first layer and a second layer, the first thermoplastic material being contained in the first layer and the second thermoplastic material being contained in the second layer.

2. The fluid conduit according to claim 1, further comprising more than two layers, the first and the second thermoplastic materials being contained in alternating layers.

3. The fluid conduit according to claim 1, wherein said first material and said second material are combined in a mixture, the mixture of the two materials being contained in an additional layer.

4. The fluid conduit according to claim 2, wherein said first material and said second material are combined in a mixture, said mixture of the two materials being contained in an additional layer.

5. The fluid conduit according to claim 3, wherein the first thermoplastic material is selected from the group consisting of a block copolymer of hard crystalline polybutyleneterephthalate blocks and soft amorphous, long-chain polyetherglycol blocks, and a thermoplastic polyester elastomer based on polybutylenenaphthalate.

6. The fluid conduit according to claim 4, wherein the second thermoplastic material is selected from the group consisting of a polybutyleneterephthalate, polyethyleneterephthalate, polybutylenenaphthalate and polyethylenenaphthalate.

7. The fluid conduit according to claim 1, wherein the layers have a preselected thickness ratio so that the fluid conduit has a sufficiently high clamping force to be securable on a pipe socket against unintended pulling off under predetermined conditions.

8. The fluid conduit of claim 1, wherein the overall thickness of the second layer is 10 to 70% of the overall wall thickness of the fluid conduit.

9. The fluid conduit according to claim 1, wherein one of the layers has a reinforcement therein selected from the group consisting of glass fibers, steel fibers, glass balls and minerals, and mixtures of at least two of these reinforcement materials.

10. The fluid conduit according to claim 1, wherein one of the layers is electrically conductive.

11. The fluid conduit according to claim 1, wherein one of the layers is antistatic.

12. The fluid conduit according to claim 1, further comprising a flame protection layer sheathing the fluid conduit.

13. The fluid conduit according to claim 12, wherein the flame protection layer is made of a reusable material.

* * * * *